(12) United States Patent
Brown et al.

(10) Patent No.: US 6,646,396 B2
(45) Date of Patent: *Nov. 11, 2003

(54) APPARATUS FOR MOTOR SYNCHRONIZATION

(75) Inventors: Fred A. Brown, Coronado, CA (US); Francisco Jauregui, Chula Vista, CA (US)

(73) Assignee: Comair Rotron, Inc., San Diego, CA (US)

(*) Notice: Subject to any disclaimer, the term of this patent is extended or adjusted under 35 U.S.C. 154(b) by 39 days.

(21) Appl. No.: 09/827,356

(22) Filed: Apr. 5, 2001

(65) Prior Publication Data

US 2002/0003409 A1 Jan. 10, 2002

Related U.S. Application Data

(63) Continuation-in-part of application No. 09/731,884, filed on Dec. 7, 2000, now abandoned.
(60) Provisional application No. 60/169,568, filed on Dec. 8, 1999.

(51) Int. Cl.$^7$ .................................................. H02P 6/04
(52) U.S. Cl. ...................... 318/268; 318/254; 388/907.5
(58) Field of Search ............................... 318/138, 254, 318/268, 439, 720, 721, 724; 388/907.5

(56) References Cited

U.S. PATENT DOCUMENTS

| | | | |
|---|---|---|---|
| 3,522,503 A | 8/1970 | Feulner ...................... 318/314 |
| 3,609,487 A | 9/1971 | Allison ....................... 318/138 |
| 3,783,357 A | 1/1974 | Ichiyange ................... 318/138 |
| 3,831,073 A | 8/1974 | Tanikoshi ................... 318/254 |
| 3,870,937 A | 3/1975 | Ban ............................ 318/314 |
| 3,940,670 A | 2/1976 | Tanikoshi ................... 318/254 |
| 4,008,425 A | 2/1977 | Dickey ....................... 318/314 |
| 4,197,489 A | 4/1980 | Dunn et al. ................. 318/138 |
| 4,249,116 A | 2/1981 | Frosch et al. ............... 318/254 |
| 4,376,262 A | 3/1983 | Okuda et al. ............... 318/696 |
| 4,629,958 A | 12/1986 | Kurakake et al. .......... 318/723 |
| 4,668,898 A * | 5/1987 | Harms et al. ............... 318/254 |
| 4,680,515 A | 7/1987 | Crook ......................... 318/318 |
| 4,749,927 A * | 6/1988 | Rodal et al. ................ 318/599 |
| 4,907,105 A | 3/1990 | Kurzweil, Jr. ........... 360/73.02 |
| 4,967,122 A | 10/1990 | Rees ........................... 318/254 |
| 5,119,466 A * | 6/1992 | Suzuki ........................ 388/831 |
| 5,270,622 A | 12/1993 | Krause ........................ 318/254 |
| 5,327,064 A * | 7/1994 | Arakawa et al. ............ 318/801 |
| 5,495,161 A | 2/1996 | Hunter ........................ 318/807 |
| 5,583,411 A | 12/1996 | Kusano et al. .............. 318/719 |
| 5,677,605 A * | 10/1997 | Cambier et al. ............ 318/254 |
| 5,912,541 A * | 6/1999 | Bigler et al. ................ 318/600 |

FOREIGN PATENT DOCUMENTS

| | | |
|---|---|---|
| EP | 0 562 452 A1 | 9/1993 |
| EP | 1 061 787 A2 | 12/2000 |

* cited by examiner

*Primary Examiner*—Bentsu Ro
(74) *Attorney, Agent, or Firm*—Bromberg & Sunstein LLP (57) ABSTRACT

A DC electric motor includes an internal programmable element that permits it to be synchronized to an external reference signal. To that end, the motor includes a rotor capable of rotating at a rotational speed, rotor circuitry that controls the rotational speed of the rotor, and an input to receive the noted external reference signal, which indicates a preset speed. In addition, the motor also includes the noted programmable element, which is operatively coupled with the input and the rotor circuitry within the motor. The programmable element is capable of comparing the external reference signal with the rotational speed of the rotor and, consequently, controls the rotor circuitry based upon the comparison of the external reference signal and the rotational speed of the rotor.

22 Claims, 4 Drawing Sheets

APPARATUS FOR MOTOR SYNCHRONIZATION

This application claims priority from U.S. patent application Ser. No. 09/731,884, filed Dec. 7, 2000, entitled "Motor Synchronization Apparatus," (abandoned) and U.S. provisional patent application Serial No. 60/169,568, filed Dec. 8, 1999, entitled "Motor Synchronization Apparatus," the disclosures of which are incorporated herein, in their entireties, by reference.

FIELD OF THE INVENTION

This invention generally relates to motors and, more particularly, the invention relates to synchronizing DC electric motor operation to a reference frequency.

BACKGROUND OF THE INVENTION

Many systems utilize multiple D.C. motors in parallel for various reasons. For example, multiple fans are utilized to cool elevators, and many computer systems utilize two or more fans to cool internal electronic components. Such systems often are preconfigured so that the fans are synchronized to operate at a substantially identical rotational speed. In practice, however, although ideally set to operate synchronously, such fans often operate at different speeds. When fans are not synchronized, they often generate a noise that many people tend to consider annoying.

SUMMARY OF THE INVENTION

In accordance with one aspect of the invention, a DC electric motor includes an internal programmable element that permits it to be synchronized to an external reference signal. To that end, the motor includes a rotor capable of rotating at a rotational speed, rotor circuitry that controls the rotational speed of the rotor, and an input to receive the noted external reference signal, which indicates a preset speed. In addition, the motor also includes the noted programmable element, which is operatively coupled with the input and the rotor circuitry within the motor. The programmable element is capable of comparing the external reference signal with the rotational speed of the rotor and, consequently, controls the rotor circuitry based upon the comparison of the external reference signal and the rotational speed of the rotor.

The programmable element preferably is a processor. In illustrative embodiments, the programmable element is capable of controlling the rotor circuitry to increase the rotational speed of the rotor if it is determined that the rotational speed of the rotor is less than the preset speed indicated in the external reference signal. In a similar manner, the programmable element also may be capable of controlling the rotor circuitry to decrease the rotational speed of the rotor if it is determined that the rotational speed of the rotor is greater than the preset speed indicated in the external reference signal.

Among other things, the rotor circuitry may include at least one of switching circuitry and commutation circuitry. The motor also may include a housing containing the rotor circuitry and programmable element. In some embodiments, the programmable element is programmed to detect an error condition with the external reference signal. The programmable element consequently sets the rotational speed of the rotor to a selected speed if the error condition is detected. By way of example, the error condition may be considered to have occurred if the preset speed is not within a prescribed range of speeds. The motor also may include an internal clock that produces an internal clock signal. The selected speed thus may be based upon the internal clock signal. The motor may be used as a fan and thus, include an impeller coupled with the rotor.

In accordance with another aspect of the invention, a motor apparatus has a first DC electric motor capable of rotating at a first rotational speed and having a first internal processor, and a second DC electric motor capable of rotating at a second rotational speed and having a second internal processor. In addition, the motor apparatus also includes a master clock that produces a reference signal indicating a preset speed. The master clock is coupled with both the first DC electric motor and the second DC electric motor. In illustrative embodiments, the first processor is capable of controlling the first rotational speed to be synchronized with the reference signal, and the second processor is capable of controlling the second rotational speed to be synchronized with the reference signal.

In some embodiments, the first DC electric motor includes a first impeller, and the second DC electric motor includes a second impeller. The first processor may include a first reference input, and the second processor includes a second reference input. The first and second reference inputs thus may be coupled with the master clock to receive the reference signal. In other embodiments, the first rotational speed and second rotational speed are substantially identical. Moreover, the motor apparatus may include a first motor housing containing the first DC electric motor, and a second motor housing containing the second DC electric motor.

The first DC electric motor may include commutation circuitry that is controlled by the first processor. The first internal processor may be programmed to detect an error condition with the reference signal and, consequently, set the first rotational speed to a selected speed if the error condition is detected. The error condition may be considered to have occurred if the preset speed is not within a prescribed range of speeds. The first internal processor may include an internal clock that produces an internal clock signal. Accordingly, the selected speed may be based upon the internal clock signal.

In accordance with another aspect of the invention, a DC electric motor includes a rotor capable of rotating at a rotational speed, rotor circuitry that controls the rotational speed of the rotor, and a receiving means for receiving an external reference signal indicating a preset speed. In addition, the motor also may include a comparing means for comparing the external reference signal with the rotational speed of the rotor. The comparing means includes means for controlling the rotor circuitry based upon the comparison of the external reference signal and the rotational speed of the rotor. The comparing means preferably is internal to the motor.

In accordance with still another aspect of the invention, a rotor circuit for controlling the speed of a rotor (i.e., the rotor being a part of a DC electric motor) includes switching circuitry that, at least in part, controls the rotational speed of the rotor, and an input for receiving an external reference signal indicating a preset speed. In addition, the rotor circuit also may include a programmable element operatively coupled with the input and the switching circuitry. The programmable element compares the speed of the rotor with the preset speed indicated in the reference signal. The programmable element controls the switching circuitry based on the comparison of the preset speed and the speed of the rotor. The switching circuitry and programmable element are internal to the motor.

BRIEF DESCRIPTION OF THE DRAWINGS

The foregoing and advantages of the invention will be appreciated more fully from the following further description thereof with reference to the accompanying drawings wherein.

DESCRIPTION OF ILLUSTRATIVE EMBODIMENTS

In illustrative embodiments of the invention, each one of a plurality of cooperating DC electric motors includes an internal processor that synchronizes motor operating speed with an externally received reference signal. Details of various embodiments are discussed below.

Figure 1:
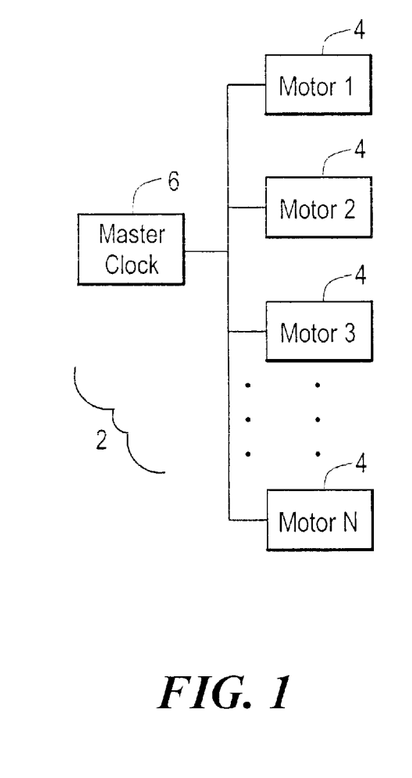
FIG. 1 schematically shows a motor apparatus having multiple motors synchronized in accordance with preferred embodiments of the invention.

FIG. 1 schematically shows a motor apparatus 2 having multiple motors synchronized in accordance with preferred embodiments of the invention. More particularly, the motor apparatus 2 includes N DC electric motors (i.e., identified as motor 1, motor 2, motor 3 . . . motor N, and generally identified as motors 4) that each are synchronized to rotate at a rotational speed as specified by a reference signal received from a master clock 6. Accordingly, each motor 4 has an internal motor synchronization circuit (discussed in detail below with reference to FIGS. 4 and 6) that receives the reference signal from the master clock 6, and rotates its respective rotor at a rotational speed that is related to the reference frequency of the reference signal. The reference signal may be any signal used to control the circuitry discussed below. To that end, the reference signal may be, among other types of waves, a square wave, a saw-tooth wave, or an AC signal.

The motor apparatus 2 may be any device known in the art that utilizes multiple motors 4. For example, the motor apparatus 2 may include parallel and/or serial motors. In illustrative embodiments, the motors 4 are implemented as plural fans for cooling a computer system. Accordingly, various embodiments are discussed with reference to a fan. It should be noted, however, that discussion of a fan is by example only and not intended to limit the scope of the invention.

Figures 2, 3:
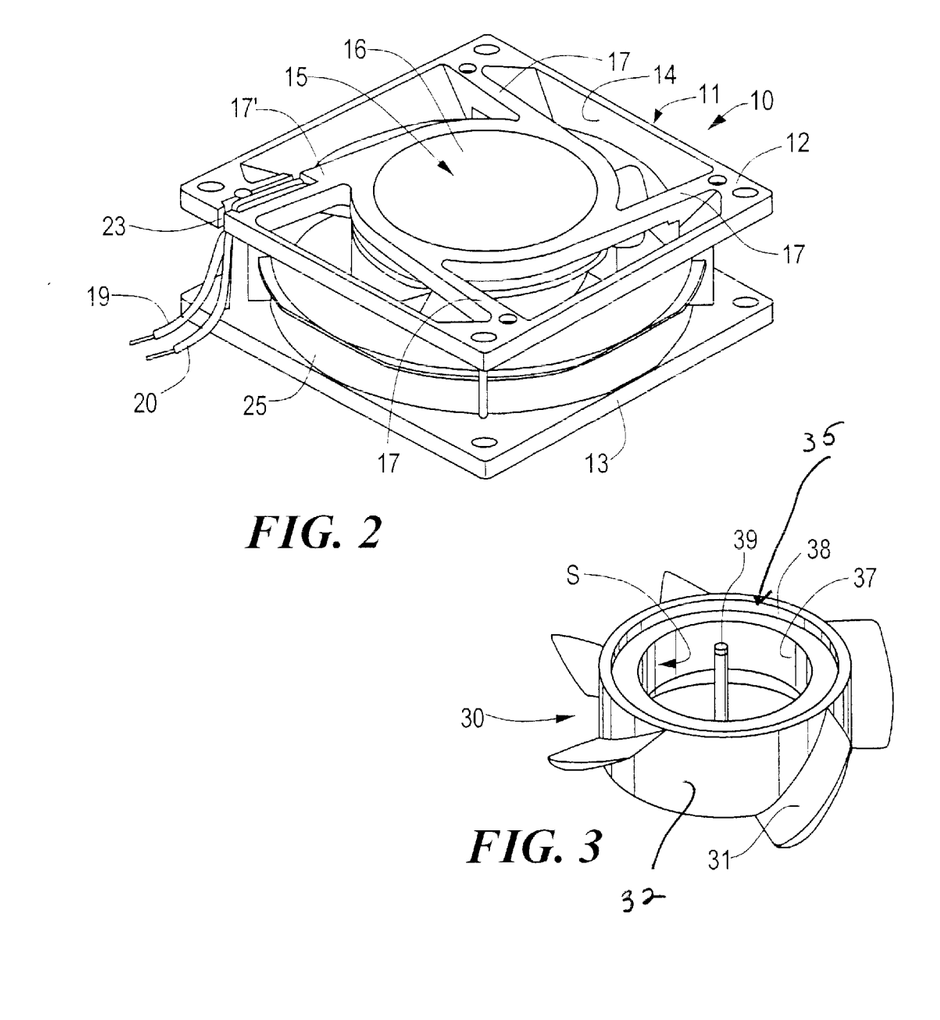
FIG. 2 schematically shows an exemplary DC brushless fan that may be configured with the synchronization circuit in accordance with preferred embodiments of the invention.
FIG. 3 schematically shows an impeller of the fan shown in FIG. 2.

FIG. 2 schematically shows an exemplary DC brushless fan that may be configured with the synchronization circuit discussed herein. As known in the art, the fan includes a housing 11 with a front surface 12, a rear surface 13, and venturi 14 extending between the front and rear surfaces 12 and 13. The motor 4, located generally at 15, is centrally located in the housing 11. The motor 4 may be any conventional DC electric motor used within fans, such as a single-phase or poly-phase motor. The fan includes a winding circuit (discussed below with reference to FIGS. 4 and 6), a synchronization circuit (also discussed below with reference to FIGS. 4 and 6), and a stator, each of which are supported in a fixed relation to the housing 11 in a central housing portion 16 that is connected to the venturi 14 by struts 17 of a spider structure. Leads 19 and 20 are brought out from the motor electronics along one strut 17. The strut 17 with the leads 19 and 20 is specially formed for this purpose with a longitudinal channel leading to a narrow groove 23 at the outer periphery of the housing 11. The groove 23 retains the leads 19 and 20 in the channel while directing them toward the generally cylindrical exterior 25 of the housing 11 as shown.

FIG. 3 illustrates an impeller 30 of the fan 10 as shown in FIG. 2. The impeller 30 includes fan blades 31 supported on a hub 32 (e.g., manufactured from plastic), which in turn is secured to a rotor 35 of the fan motor 4. The rotor 35 has an annular permanent magnet 37 in a steel cup 38. A central shaft 39, which is secured to the end face of the cup 38, is received in bearings (not shown) in the stator assembly of FIG. 2 when the fan 10 is assembled. Of course, the impeller 30 also may be a propellor or other similar apparatus utilized in fans.

Figure 4:
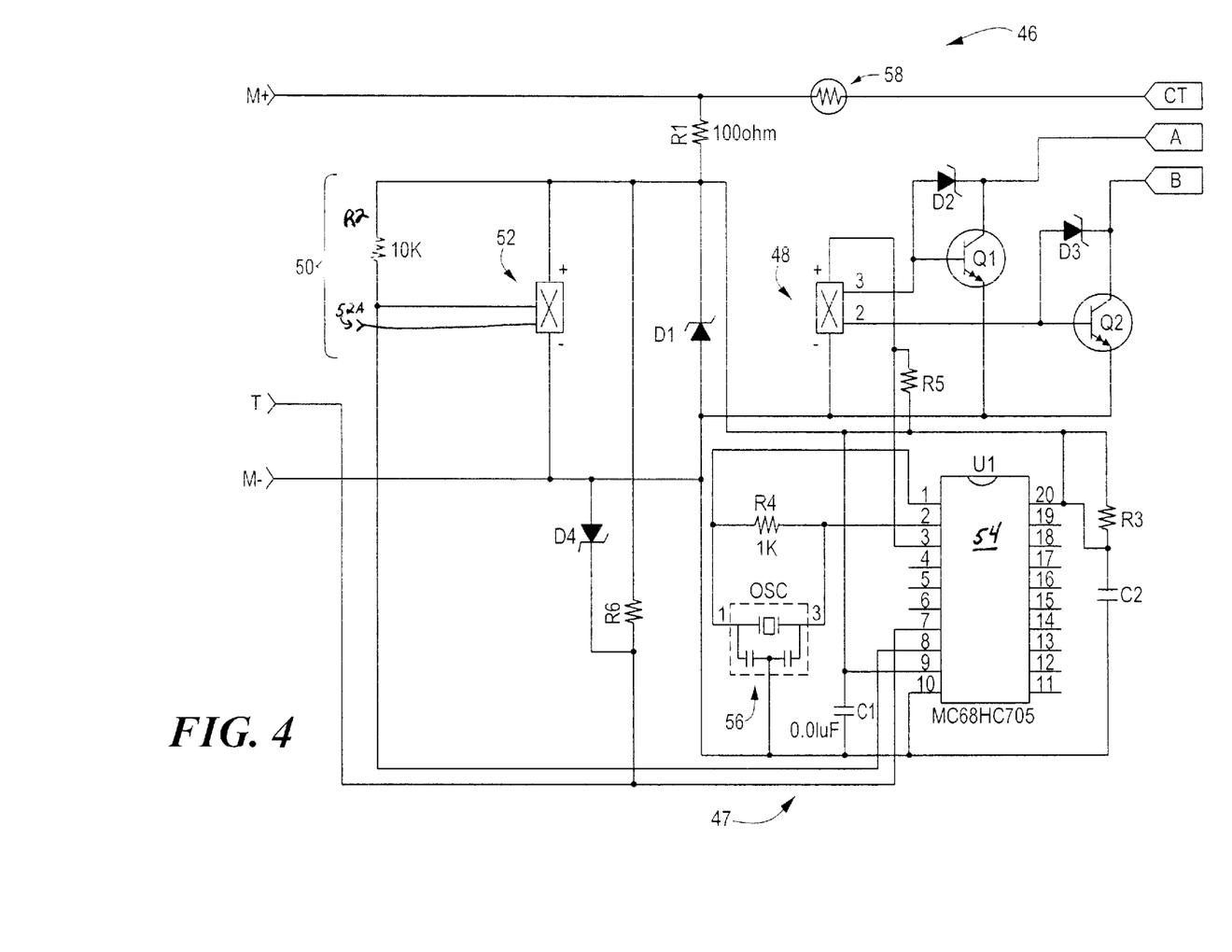
FIG. 4 schematically shows coil energization and synchronization circuits configured in accordance with one embodiment of the invention.

FIG. 4 schematically shows an illustrative commutation circuit 46 that rotates the rotor 35 at a reference frequency prescribed by the master clock 6. In this embodiment, the commutation circuit 46 is entirely internal to a single motor 4. More particularly, FIG. 4 schematically shows a commutation circuit 46 that has been configured to include a programmable device (e.g., a microprocessor) for synchronizing rotor speed with the reference signal generated by the master clock 6. Accordingly, the commutation circuit 46 may be considered to include a programmable device (referred to below as synchronization circuit 47) that synchronizes rotor speed with the reference signal.

The commutation circuit 46 includes a plurality of circuit elements that are coupled with a first coil ("coil A"), a second coil ("coil B"), and a center tap of the coils (identified by "CT"). As known in the art, the coils interact with the magnet 37 of the rotor 35 to effectuate rotor rotation. Accordingly, the circuit further includes a first hall sensor 48 having a first output to a first switching transistor Q1, and a second output to a second transistor Q2. Each transistor Q1 and Q2 has a respective Zener diode D2 and D3 for limiting its respective collectors base voltage. The first hall sensor 48 is powered by a power resistor R5 that is connected to its positive terminal.

The commutation circuit 46 also includes a tachometer 50 for monitoring the rotation of the rotor 35. More particularly, the tachometer 50 includes a second hall sensor 52 positioned in a manner that enables it to sense the magnetic field produced by the magnet 37 of the impeller 30. In a manner similar to the first hall sensor 48, the second hall sensor 52 is powered by a resistor R2. In addition to its prior noted elements, the commutation circuit 46 also includes another Zener diode D1 with a series resistor R1 for voltage regulation, a Zener D4 with resistor R6 to maintain constant input voltage, and a motor protection device 58, such as a positive temperature coefficient thermistor (commonly referred to as a "PTC"). Use of the motor protection device 58 helps to ensure that the fan motor windings are protected from high current conditions.

In accord with illustrative embodiments of the invention, the commutation circuit 46 also includes a synchronization circuit 47 (noted briefly above) for synchronizing the rotation of the rotor 35 with the reference signal received from the master clock 6. To that end, the synchronization circuit 47 includes a programmable device, such as a processor 54, that is programmed to synchronize the rotor speed with the reference signal. The processor 54 may be any processor known in the art, such as a model number MC68HC705 microprocessor, distributed by Motorola, Inc. of Schaumberg, Ill. The processor 54 operates at a rate specified by an internal clock, such as an external oscillator 56. Note that although referred to as "external," the external oscillator 56 is internal to and a part of the overall commutation circuit 46. It is referred to as an external oscillator since it is external to the processor 54. In alternative embodiments, the processor 54 includes an internal oscillator or other clocking device for timing its processes.

The exemplary processor 54 has twenty pins numbered from 1 to 20. The pins are coupled to the following elements:

- pins 1 and 2: Both of these pins are connected to the external oscillator 56 for receiving a timing signal to time its internal processes;
- pin 3: This pin is an output to the first hall sensor 48 of the commutation circuit 46 to control the energization of the first hall sensor 48 and, consequently, the rotational speed of the motor 4;
- pins 4–6, 11–18: These pins are unused;
- pin 7: This pin is a reference signal input that is coupled with the master clock 6 to receive the external reference signal;
- pin 8: This pin is a tachometer input that receives a speed signal (identifying the speed of the rotor 35) from the tachometer 50;
- pins 9 and 10: These pins receive power from a power supply (not shown);
- pin 19: This pin is used to receive input data from a sensor, such as a temperature sensor; and
- pin 20: This pin is coupled with a capacitor C2 and resistor R3, both of which are used for start-up delay and reset purposes.

A prototype built that should produce satisfactory results has the following element values:

- R1: 100 ohms;
- R2: 10,000 ohms;
- R3: 2.4 megaohms;
- R4: 1,000 ohms;
- R5: 260 ohms;
- C1: 0.01 microfarads; and
- C2: 2.2 microfarads
- D1 and D4: 5.1 volt Zener diodes; and
- D2 and D3: 32 volt Zener diodes for a 12 volt applications.

It should be noted that all element values recited herein are exemplary and may be adjusted by those skilled in the art. Accordingly, these values are not intended to limit preferred embodiments of the invention.

As known by those skilled in the art, if the first hall sensor 48 is provided with a continuous source of power, it should switch the transistors Q1 and Q2 at a rate that rotates the rotor 35 at the maximum rated speed of the motor 4. In illustrative embodiments, however, the processor 54 intermittently switches the power to the first hall sensor 48 "off" and "on" in a carefully controlled manner to ensure that the rotor 35 rotates at the rate prescribed by the master clock 6. Accordingly, the rotational speed of the rotor 35 typically should be less than the maximum rated speed of the motor 4.

In alternative embodiments of the invention, the reference signal may derive from another source other than the master clock 6. No external master clock 6 thus is necessary since one of the motors 4 generates the reference signal. For example, the reference signal may be derived from the oscillator 56 in one of a plurality of coupled motors 4. Accordingly, referring to FIGS. 1 and 4, the timing signal from the external oscillator 56 within motor 2 may be transmitted to motors 1, 3 and 4. In such case, motors 1–4 thus may set their rotational speed to the external oscillator 56 in motor 2.

In other embodiments, the tachometer 50 in one motor 4 generates the reference signal. Accordingly, the commutation circuit 46 shown in FIG. 4 also may include additional elements to effectuate this result. More particularly, the processor 54 may be preprogrammed to ascertain if it is coupled with a sensor, such as a temperature sensor (not shown) that detects the temperature at a given location. If coupled with such a sensor, then it is deemed the master motor 4 and thus, produces the reference signal. The master motor 4 therefore is in a master/slave relationship with the other motors 4, where the other motors are slave motors 4. Accordingly, the tachometer 50 also includes an output line 52A to produce an output signal that is used as the reference signal for the other slave motors 4. In this case, the tachometer output line 52A is connected to pin 7 on the processors 54 in each slave motor 4.

By way of example, the processor 54 may be programmed to modify the speed of the motors if the temperature sensed by the temperature sensor is measured to be outside of a prespecified temperature range. When such a temperature is sensed, the processor 54 controls the motor 4 to change its speed. This speed change consequently is detected by the tachometer 50, which responsively generates a new speed signal for the master motor 4. The other slave motors 4 (i.e., their processors 54) consequently receive the changed reference signal (from the tachometer 50 of the master motor 4), and adjust their speed appropriately.

In yet other embodiments, regardless of its source, the reference signal may change during operation. For example, the master clock 6 may have a temperature sensor (discussed above) that detects the temperature within a device being cooled. In a manner similar to the embodiment noted above, if the temperature is outside of a preset temperature range, then the frequency of the reference signal may change in a corresponding manner to cause the motors to rotate at a different rate.

The master clock 6 may be manually adjustable so that it can be reprogrammed to change the frequency of the reference signal. To that end, the master clock 6 may include a digital or analog display, knob, or other adjustment device that permits an operator to change the frequency of the reference signal. Alternatively, the master clock 6 may include programmable elements that permit the clock to be manually reprogrammed.

Figure 5:
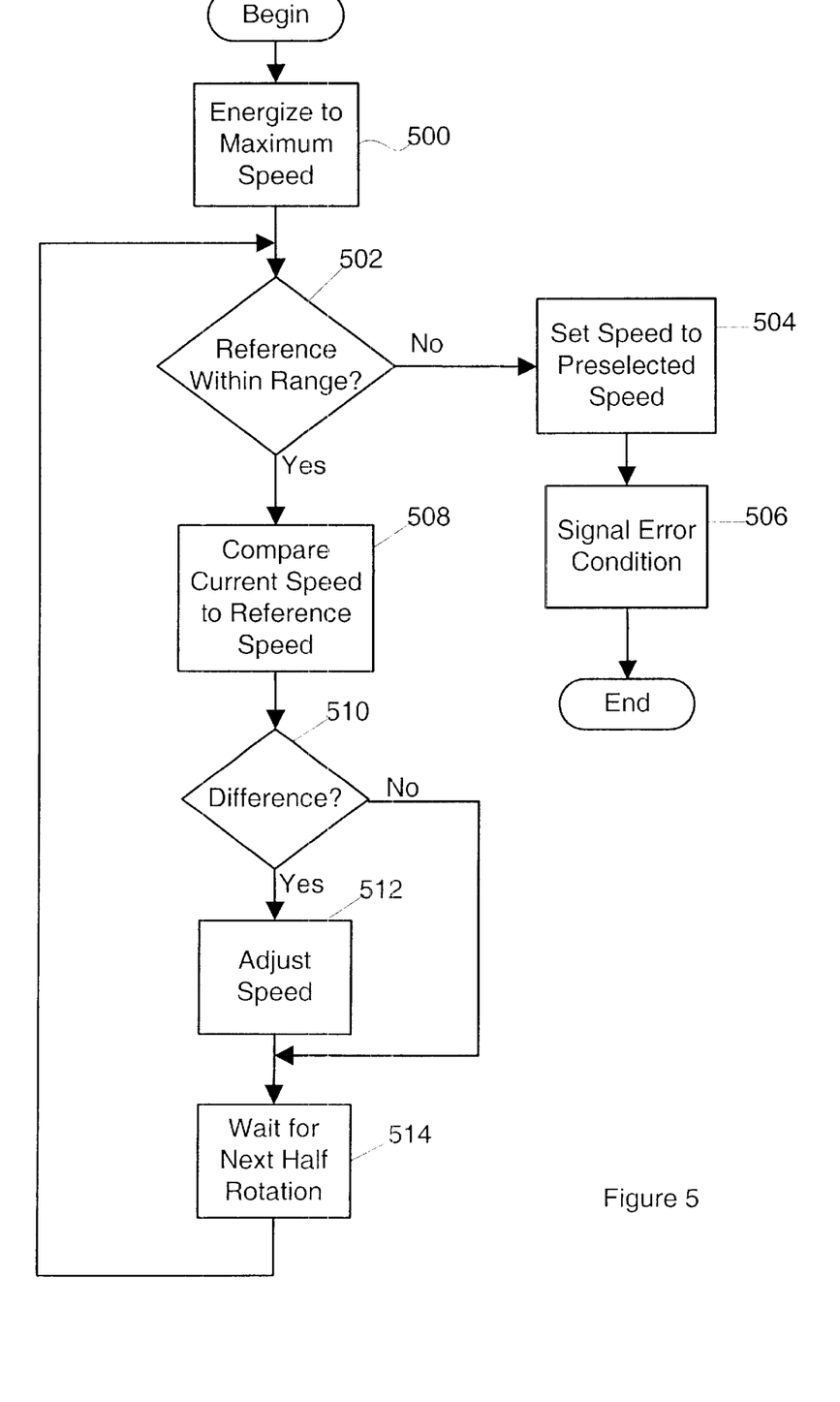
FIG. 5 shows a preferred process of synchronizing the rotational speed of the motor with a reference frequency.

As noted above, the processor 54 is preprogrammed to execute in accordance with a set of instructions. FIG. 5 shows one such process executed by the processor 54 for maintaining the rotor speed at a preselected rate. The process begins at step 500, in which the coils A and B are energized to rotate the rotor 35 at its maximum speed. Forcing the rotor 35 to its maximum speed reduces the effect of inertia of startup.

It then is determined at step 502 if the frequency of the reference signal received by the processor 54 is within a prescribed frequency range. In illustrative embodiments, this frequency range is preprogrammed into the processor 54. More particularly, the processor may be programmed to operate in a specified manner if the reference signal is not within such prescribed frequency range. This permits the motor 4 first to determine that some error condition exists, and then to compensate for the error condition appropriately. For example, the master clock 6 may malfunction (e.g., crash), or the connection between the master clock 6 and the processor 54 may become broken. In either case, the reference signal may not be received by the processor 54. Accordingly, the processor 54 detects this condition as having a zero frequency, which is not within a prescribed frequency range that is greater than zero. In response, the processor 54 executes various processes to compensate for this condition. As another example, the reference signal may have a frequency that does not cause the motors to rotate at a sufficiently rapid rate. For example, use of a reference signal of this frequency could cause the motors 4 to not rotate rapidly enough to cool electronic components within a computer housing. In this case, the processor 54 may detect that such frequency is too low, and compensate appropriately.

In illustrative embodiments, the processor 54 compensates for a reference signal being outside of the prescribed range by executing steps 504 and 506. In particular, the processor continues to step 504, in which the rotational speed of the motor is set to a preselected speed preprogrammed into the processor 54. This preselected speed is independent of the reference signal. In illustrative embodiments, this preselected speed is the maximum speed of the motor 4. In other embodiments, the preselected speed is less than the maximum speed. In such case, the preselected speed is timed from the external oscillator 56.

The process then continues to step 506, in which the processor signals this error condition to some other module within the motor. For example, an error light (e.g., a light emitting diode, not shown) may be illuminated to visually indicate that an error condition exists. When used as one of a plurality of motors 4 (as shown in FIG. 1), a noticeable sound should occur at many speeds since the motors 4 now are no longer synchronously operating. In addition to the above noted error light, this noise may be considered an additional indicator of the error condition.

Returning to step 502, if the reference signal is determined to be within the prescribed range, then the current speed (e.g., the switching frequency of the transistors Q1 and Q2), as determined by the tachometer 50, is compared with the reference frequency in the reference signal in accordance with conventional comparison processes (step 508). In exemplary embodiments, the reference signal may have a frequency of 120 hertz. Accordingly, the frequency of the speed signal from the tachometer 50 (i.e., at this point in time, the maximum frequency), is compared against 120 hertz.

It then is determined at step 510 if there is a difference between the reference signal and the speed signal. If such a difference is determined, then the process continues to step 512, in which the processor 54 adjusts current speed of the rotor 35 appropriately. For example, the speed may be reduced a preselected amount from the maximum speed. As noted above, the processor 54 reduces the speed by switching the power to the first hall sensor 48 "off" and "on" in a controlled manner.

If, however, at step 510 it is determined that there is no difference between the reference signal and the speed signal, then the process skips to step 514, in which the processor 54 waits for the next half rotation of the rotor 35, and then loops back to step 502 to determine if the reference signal is within the prescribed frequency range. Accordingly, the speed of the rotor 35 preferably is checked and, if necessary, adjusted about every half revolution of the rotor 35. This process continues until the motor 4 no longer is operating. Of course, in illustrative embodiments, the reference signal is the same as that received by each of the parallel motors 4 (i.e., fans) in the motor apparatus 2 shown in FIG. 1. This consequently causes each motor 4 to operate at approximately the same speed.

As noted above, the processor 54 is preprogrammed to execute the process shown in FIG. 5 to effectuate synchronous rotation of each motor 4. In preferred embodiments, assembly language specific to the processor 54 is used. In other embodiments, any language that can be processed by the processor 54 may be used.

The frequency of the reference signal may be used to control the rotational speed, via the process shown in FIG. 5, in various different ways. In the embodiment discussed with regard to FIG. 5, for example, the processor 54 is programmed to rotate the rotor 35 at a speed that corresponds directly to the frequency of the reference signal. For example, if the reference signal has a frequency of 120 hertz, then the processor 54 rotates the rotor 35 at a rate of 120 hertz. In other embodiments, the processor 54 is programmed to rotate the rotor 35 at some whole or fractional multiple of the frequency of the reference signal. In yet other embodiments, the frequency of the reference signal may be used as input into a mathematical function that determines a specific speed for rotating the rotor 35. Accordingly, the frequency of the reference signal may be considered to be a baseline frequency that is used in some manner to calculate a rotational frequency for a motor 4.

Figure 6:
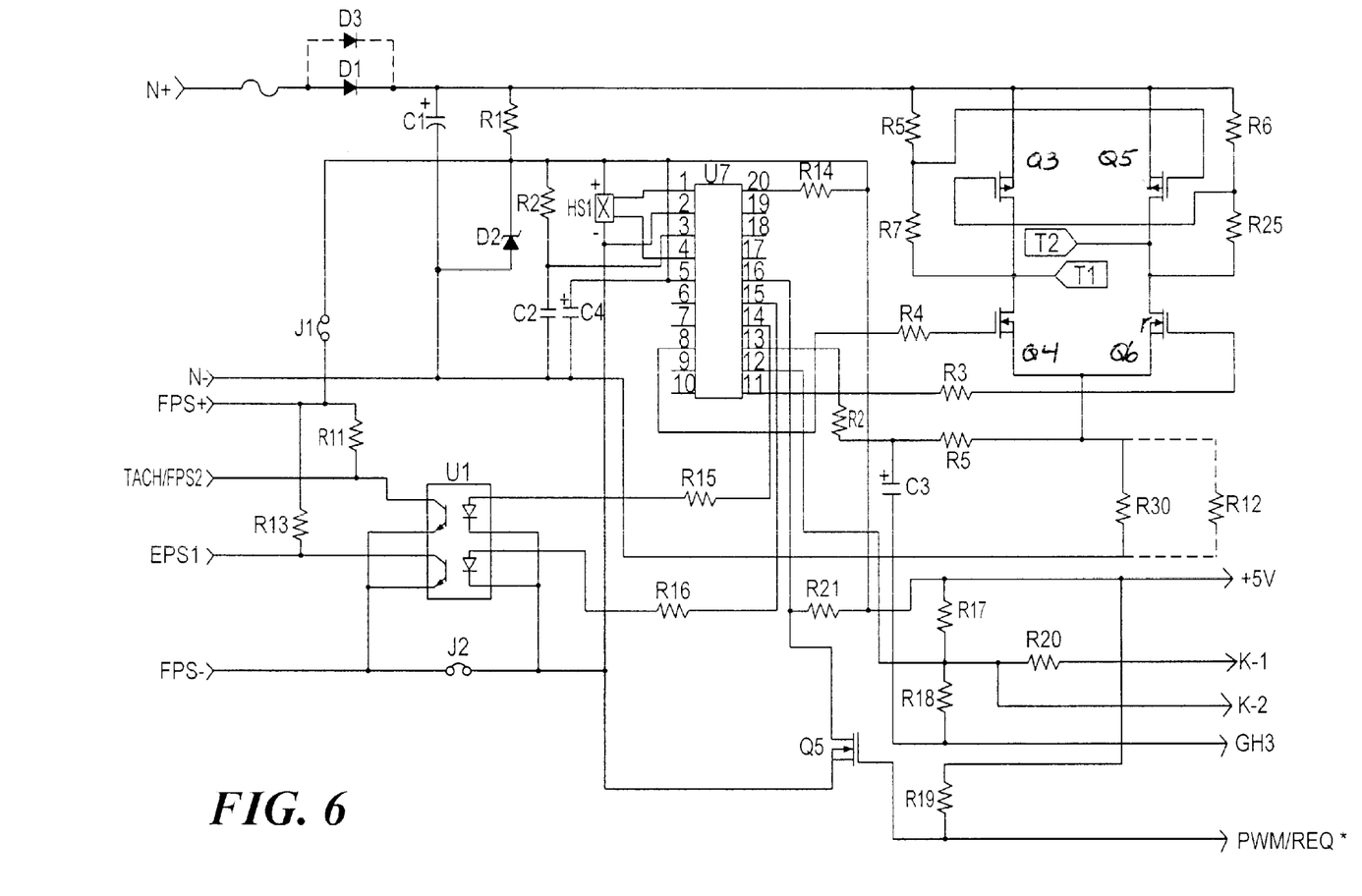
FIG. 6 schematically shows coil energization and synchronization circuits configured in accordance with another embodiment of the invention.

FIG. 6 shows an alternative embodiment of the invention, in which the commutation circuit includes four transistors Q3–Q6 configured as an H-bridge (referred to herein as "H-bridge"). In particular, the H-bridge uses transistors Q3–Q6 to permit substantially 100% of the coils to be used in either direction without requiring a center-tap. To that end, the processor (identified in this figure as microprocessor U7) is programmed to switch transistors Q4 and Q6 "on" and "off" at a selected frequency via respective pins 8 and 11. No more than one of transistors Q4 and Q6 is turned on at any given time.

Energization of transistor Q6 consequently energizes transistor Q3. When in such state, current flows through coil inputs T1 and T2 in one direction. In a similar manner, energization of transistor Q4 consequently energizes transistor Q5. When in this state, the current flows in the opposite direction through the coil inputs T1 and T2. In a manner similar to the circuit shown in FIG. 4, the microprocessor U7 switches the transistors "on" and "off" at a rate as prescribed by the reference signal to facilitate rotation of the rotor 35 at a specified rate.

As previously noted, the processor 54 in FIG. 4 cooperates with the first hall sensor 48 to control switching of its respective transistors Q3 and Q4. Unlike the circuit shown in FIG. 4, however, the microprocessor U7 in FIG. 6 directly controls the switching of the transistors without requiring that a hall sensor be connected to the transistors Q3–Q6. The microprocessor does use a hall sensor HS1, however, to receive a speed signal representing the rotational speed of the rotor 35. To that end, pins 1 and 4 of microprocessor U7 are connected to hall sensor HS1, which acts as a tachometer. Accordingly, as discussed with reference to FIG. 5, the microprocessor U7 controls the rotation of the rotor 35 by comparing the reference frequency with the speed signal received from HS1.

In some embodiments, the microprocessor may serve to synchronize the rotor 35 with the reference signal only. In other embodiments, however, the microprocessor U7 can direct further tasks. For example, the commutation circuit shown in FIG. 6 includes a pair of optocouplers U1 that forward tachometer and fan performance data received from the microprocessor U7.

It is expected that preferred embodiments can control a wide range of rotational speeds. For example, preferred embodiments should control motors 4 that are rated to rotate at commonly used speed ratios ranging from 600 to 6,000 revolutions per minute, while synchronizing fan speeds (of multiple fans) to within 1.5 revolutions per second. Of course, many embodiments should control motors 4 operating at speeds outside of this range. Moreover, preferred embodiments should be scalable to control a large number of motors 4 that are controlled in the manner described herein. Since there is a minimum of components (i.e., by using the processor 54 or U7), the synchronization circuit 47 can be integrated with existing motor commutation circuits.

As suggested above, the disclosed apparatus and method may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adaptor connected to a network over a medium. The medium may be either a tangible (e.g., optical or analog communications lines) or a medium implemented with wireless techniques (e.g., microwave, infrared, or other transmission techniques).

The series of computer instructions embodies all or part of the functionality previously described herein with respect to the system and method. Those skilled in the art should appreciate that such computer instructions can be written in a number of programming languages for use with may computer architectures or operating systems. Further, such instructions may be stored in any memory device, such as a semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), pre-loaded with a computer system (e.g., on system ROM or fixed disk), or distributed from a server or electronic bulletin board over a network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A DC electric motor comprising:
    a rotor capable of rotating at a rotational speed;
    rotor circuitry that controls the rotational speed of the rotor;
    means for receiving an external reference signal indicating a preset speed;
    means for comparing the external reference signal with the rotational speed of the rotor, the comparing means for controlling the rotor circuitry based upon the comparison of the external reference signal and the rotational speed of the rotor, the comparing means being internal to the motor,
    wherein the comparing means includes means for detecting an error condition with the external reference signal, the comparing means setting the rotational speed of the rotor to a selected speed if the error condition is detected,
    the motor further comprising an internal clock producing an internal clock signal, the selected speed being based upon the internal dock signal.

2. The DC electric motor as defined by claim 1 wherein the comparing means is a processor.

3. The DC electric motor as defined by claim 1 wherein the comparing means includes means for controlling the rotor circuitry to increase the rotational speed of the rotor if it is determined that the rotational speed of the rotor is less than the preset speed indicated in the external reference signal.

4. The DC electric motor as defined by claim 1 wherein the comparing means includes means for controlling like rotor circuitry to decrease the rotational speed of the rotor if it is determined that the rotational speed of the rotor is greater than the preset speed indicated in the external reference signal.

5. The DC electric motor as defined by claim 1 wherein the rotor circuitry includes commutation circuitry.

6. The DC electric motor as defined by claim 1 further including:
    a housing containing the rotor circuitry and comparing means.

7. The DC electric motor as defined by claim 1 wherein the error condition is considered to have occurred if the preset speed is not within a prescribed range of speeds.

8. The DC electric motor as defined by claim 1 further comprising:
    an impeller coupled with the rotor.

9. A DC electric motor comprising:
    a rotor capable of rotating at a rotational speed;
    rotor circuitry that controls the rotational speed of the rotor;
    an input to receive an external reference signal indicating a preset speed;
    a programmable element operatively coupled with the input and the rotor circuitry within the motor, the programmable element being capable of comparing the external reference signal with the rotational speed of the rotor, the programmable element controlling the rotor circuitry based upon the comparison of the external reference signal and the rotational speed of the rotor,
    wherein the programmable element is programmed to detect an error condition with the external reference signal, the programmable element setting the rotational speed of the rotor to a selected speed if the error condition is detected,
    the motor further comprising an internal clock producing an internal clock signal, the selected speed being based upon the internal clock signal.

10. The DC electric motor as defined by claim 9 wherein the programmable element is a processor.

11. The DC electric motor as defined by claim 9 wherein the programmable element is capable of controlling the rotor circuitry to increase the rotational speed of the rotor if it is determined that the rotational speed of the rotor is less than the preset speed indicated in the external reference signal.

12. The DC electric motor as defined by claim 9 wherein the programmable element is capable of controlling the rotor circuitry to decrease the rotational speed of the rotor if it is determined that the rotational speed of the rotor is greater than the preset speed indicated in the external reference signal.

13. The DC electric motor as defined by claim 9 wherein the rotor circuitry includes commutation circuitry.

14. The DC electric motor as defined by claim 9 further including:
   a housing containing the rotor circuitry and programmable element.

15. The DC electric motor as defined by claim 9 wherein the error condition is considered to have occurred if the preset speed is not within a prescribed range of speeds.

16. The DC electric motor as defined by claim 9 further comprising:
   an impeller coupled with the rotor.

17. A rotor circuit for controlling the speed of a rotor, the rotor being a part of a DC electric motor, the rotor circuit comprising:
   switching circuitry that, at least in part, controls the rotational speed of the rotor;
   an input for receiving an external reference signal indicating a preset speed; and
   a programmable element operatively coupled with the input and the switching circuitry, the programmable element comparing the speed of the rotor with the preset speed indicated in the reference signal, the programmable element controlling the switching circuitry based on the comparison of the preset speed and the speed of the rotor, the switching circuitry and programmable element being internal to the motor, wherein the programmable element is programmed to detect an error condition with the external reference signal, the progrmmable element setting the speed of the rotor to a selected speed if the error condition is detected, the motor further comprising an internal clock producing an internal clock signal, the selected speed being based upon the internal clock signal.

18. The rotor circuit as defined by claim 17 wherein the motor includes a stator with coils, the switching circuitry transmitting current to the coils based upon the rotational position of the rotor.

19. The rotor circuit as defined by claim 17 wherein the programmable element is a processor.

20. The rotor circuit as defined by claim 17 wherein the programmable element is capable of controlling the switching circuitry to increase the speed of the rotor if it is determined that the speed of the rotor is less than the preset speed indicated in the external reference signal.

21. The rotor circuit as defined by claim 17 wherein the programmable element is capable of controlling the switching circuitry to decrease the speed of the rotor if it is determined that the speed of the rotor is greater than the preset speed indicated in the external reference signal.

22. The rotor circuit as defined by claim 17 wherein the error condition is considered to have occurred if the preset speed is not within a prescribed range of speeds.

* * * * *

UNITED STATES PATENT AND TRADEMARK OFFICE
CERTIFICATE OF CORRECTION

PATENT NO.   : 6,646,396 B2
DATED        : November 11, 2003
INVENTOR(S)  : Fred A. Brown et al.

It is certified that error appears in the above-identified patent and that said Letters Patent is hereby corrected as shown below:

<u>Column 10,</u>
Line 22, replace "like" with -- the --.

<u>Column 12,</u>
Line 6, replace "progrmmable" should read -- programmable --.

Signed and Sealed this

Sixth Day of January, 2004

JAMES E. ROGAN
*Director of the United States Patent and Trademark Office*